(No Model.)
W. STANLEY, Jr.
REGULATING SELF EXCITING ALTERNATE CURRENT ELECTRIC GENERATORS.
No. 404,120. Patented May 28, 1889.
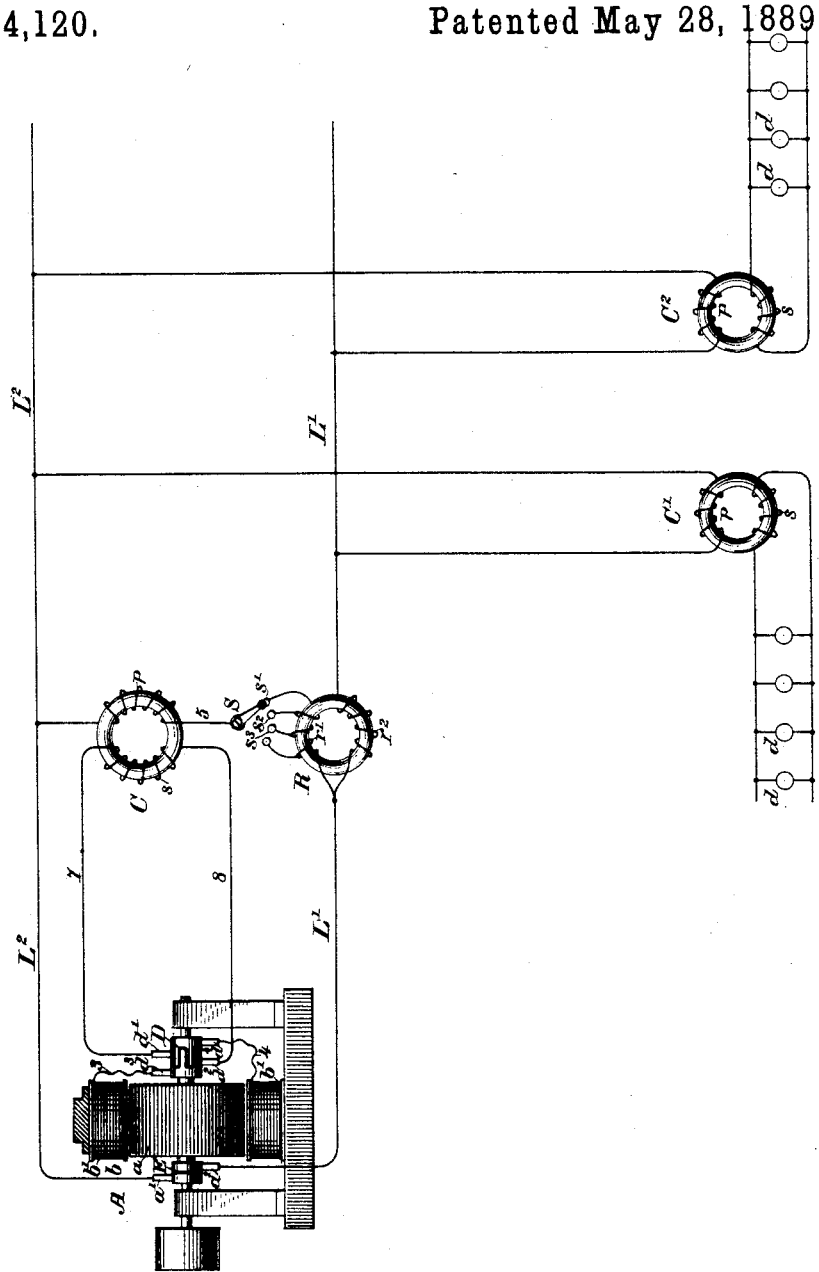
Witnesses.
Geo. W. Breck
Carrie E. Ashley
Inventor,
Wm. Stanley Jr.
By his Attorneys
Pope Edgcomb & Ferry

UNITED STATES PATENT OFFICE.

WILLIAM STANLEY, JR., OF GREAT BARRINGTON, MASSACHUSETTS, ASSIGNOR TO THE WESTINGHOUSE ELECTRIC COMPANY, OF PITTSBURG, PENNSYLVANIA.

REGULATING SELF-EXCITING ALTERNATE-CURRENT ELECTRIC GENERATORS.

SPECIFICATION forming part of Letters Patent No. 404,120, dated May 28, 1889.

Application filed September 1, 1887. Serial No. 248,487. (No model.)

*To all whom it may concern:*

Be it known that I, WILLIAM STANLEY, Jr., a citizen of the United States, residing at Great Barrington, in the county of Berkshire and State of Massachusetts, have invented certain new and useful Improvements in Regulating Self-Exciting Alternate-Current Electric Generators, of which the following is a specification.

The invention relates to an organization of apparatus for producing alternating electric currents of an approximately constant difference of potential.

The object of the invention is to provide means for causing an alternate-current electric generator to be excited by currents derived from its armature, and to cause the field-magnet strength to be varied in accordance with the variations in the current consumed in the work-circuit, so that an approximately constant difference of potential may be maintained between the terminals of the generator.

In general terms, the invention may be said to consist in supplying the field-magnet coils with a rectified current derived from the secondary coil of an electric converter, the primary of which is included in a shunt around the work-circuit or across from one terminal to the other of the generator. One coil of a differentially-wound inductive resistance is included in series with the primary coil of the converter, while the other coil of this resistance is included in series with the work-circuit. The variations in resistance or counter electro-motive force developed by reason of this inductive resistance governs the current through the primary of the converter, and thus regulates the current delivered to the field-magnet coils.

In an application filed October 18, 1888, Serial No. 288,449, the method herein shown is claimed.

In the accompanying drawing there is shown, partly in diagram, an organization of circuits and apparatus adapted to carry out the invention.

Referring to the figure, A represents an alternate-current generator having an armature, $a$, and a field-magnet, $b$. The field-magnet coils $b'$ are designed to be supplied with rectified currents derived, in a manner to be described, from the conductors L' and $L^2$, which respectively lead from the brushes $a'$ $a^2$ applied to the collector E. The collector E consists of two rings, respectively connected with the terminals of the armature-coils in a manner well understood.

The lines L' $L^2$ supply converters C' $C^2$, which have in this instance their secondary coils $s$ $s$ connected through translating devices $d$ $d$, while the primary coils are connected in multiple arc between the lines L' $L^2$. The organization of the work-circuit, however, may be variously modified.

Between the lines L' $L^2$ there is connected the primary coil $p$ of a converter, C. The secondary coil $s$ of this converter has its respective terminals connected by conductors 7 and 8 with the contact-brushes $d'$ $d^2$ of a rectifying-commutator, D. This commutator may be carried upon the shaft of the generator A. The other brushes, $d^3$ and $d^4$, of this commutator are connected by conductors 3 and 4 with the respective terminals of the field-magnet coils $b'$ of the generator, and therefore rectified currents will be delivered to these coils.

For the purpose of rendering the strength of the rectified current which is delivered to the field-magnet coils dependent upon the variations in the work being done an inductive resistance, R, is employed. This consists of a soft-iron core wound with two coils, $r'$ $r^2$, which oppose each other. The coil $r'$ is connected in series with the coil $p$ of the converter C, while the coil $r^2$ is connected in the line L' leading to the work-circuit, and thus in series with the devices to be operated. Now it is evident that in order to maintain a constant difference of potential between the terminals of the armature the field-excitement must be increased when the difference of potential between the terminals of the armature falls off or decreases, and vice versa. It is also evident that the difference of potential between the brushes $a'$ and $a^2$ will tend to be lower when a considerable current is flowing through the main line than when little current is flowing. The fluctuations or variations of current flowing through the main line are employed for automatically varying the counter electro-motive force developed in the resistance R, thereby varying the electro-motive force applied to the converter C, and thus in turn varying the electro-motive force applied to the field-magnet coils.

If, now, equal currents flow through the coils $r'$ and $r^2$, no counter electro-motive force will be developed in the resistance R; but as the work being done is diminished less current will flow through the coil $r^2$, and thus more counter electro-motive force will be developed in the coil $r'$, thus diminishing the current which will flow through the coil $p$ of the converter C. This in turn diminishes the current delivered to the field-magnet coils. If, now, more current is required in the work-circuit, the inductive resistance or counter electro-motive force in the coil $r'$ will be diminished, allowing more current to pass through the coil $p$ of the converter C.

The ratio between the converter C and the inductive resistance R may be varied in any manner desired, so that the required current for supplying the field-magnets may be obtained, and the coil $s$ of the converter C may be constructed with reference to the coil $p$, so as to reduce or increase the difference of potential at the terminal of the field-magnet coils as required. It may be desirable in some instances to construct the coil $r'$ so that its active length may be varied to accommodate the apparatus to the particular requirements of a system. This may be accomplished by means of a switch, S, connected with a conductor, 5, and applied to switch-points $s'$, $s^2$, and $s^3$, connected with different points in the length of the coil $r'$.

I claim as my invention—

1. The combination, with an electric generator supplying alternate currents, of a converter having its primary coil connected across the terminals of the armature of the generator, a rectifying-commutator through which the currents from the secondary coil of the converter are delivered to the field-magnet coils of the generator, and a differential inductive resistance, one coil being included in series with the primary coil of the converter and the other coil in series with the work-circuit, substantially as described.

2. The combination, with an alternate-current electric generator, of an inductive resistance wound with opposing coils, one coil being connected in series with the work-circuit of the generator and the other in multiple arc with the work-circuit, a converter having its primary coil in series with the last-named coil, a rectifying-commutator connected with the terminals of the secondary coil of the converter, and conductors connecting the rectifying-commutator with the field-magnet coils of the generator.

3. The combination, with an alternate-current electric generator, of an inductive resistance wound with opposing coils, one coil being connected in series with the work-circuit of the generator and the other in multiple arc with the work-circuit, a converter having its primary coil in series with the last-named coil, a rectifying-commutator connected with the terminals of the secondary coil of the converter, conductors connecting the rectifying-commutator with the field-magnet coils of the generator, and means for varying the relative lengths of the coils of the inductive resistance.

4. The combination, with an alternate-current electric machine, of a conductor connected across the poles of the same through which currents are supplied to the field-magnet coils, an inductive resistance included in said conductor, and a coil connected in the main circuit for varying the value of the inductive resistance in inverse proportion to the current consumed in the work-circuit.

In testimony whereof I have hereunto subscribed my name this 19th day of August, A. D. 1887.

WILLIAM STANLEY, Jr.

Witnesses:
CHARLES A. TERRY,
JOSEPH B. BRAMAN.